US012331972B2

(12) United States Patent
Steele et al.

(10) Patent No.: US 12,331,972 B2
(45) Date of Patent: Jun. 17, 2025

(54) 3D GRADIENT POROUS STRUCTURE FOR PHASE SEPARATION UTILIZING ADDITIVE MANUFACTURING METHODS

(71) Applicant: Mott Corporation, Farmington, CT (US)

(72) Inventors: James K. Steele, Middlefield, CT (US); Vincent P. Palumbo, East Granby, CT (US); Matthew Siok, Farmington, CT (US); Sean Kane, Cranberry Township, PA (US); Aravind Mohanram, Avon, CT (US)

(73) Assignee: MOTT CORPORATION, Farmington, CT (US)

( * ) Notice: Subject to any disclaimer, the term of this patent is extended or adjusted under 35 U.S.C. 154(b) by 859 days.

(21) Appl. No.: 17/029,247

(22) Filed: Sep. 23, 2020

(65) Prior Publication Data

US 2021/0095902 A1    Apr. 1, 2021

Related U.S. Application Data

(60) Provisional application No. 62/907,077, filed on Sep. 27, 2019.

(51) Int. Cl.
*F25B 43/04*    (2006.01)
*B01D 19/00*    (2006.01)
*C01C 1/12*    (2006.01)

(52) U.S. Cl.
CPC ........ *F25B 43/043* (2013.01); *B01D 19/0047* (2013.01); *C01C 1/12* (2013.01)

(58) Field of Classification Search
CPC .... F25B 43/043; F25B 43/00; F25B 2400/23; B01D 19/0047; B01D 19/0031; C01C 1/12
See application file for complete search history.

(56) References Cited

U.S. PATENT DOCUMENTS

| 5,236,474 A | * | 8/1993 | Schofield | ............... B01D 53/22 95/52 |
| 6,402,818 B1 | * | 6/2002 | Sengupta | ........... B01D 63/0221 96/6 |
| 2006/0032242 A1 | * | 2/2006 | TeGrotenhuis | ...... B01D 5/0015 62/93 |
| 2006/0094852 A1 | * | 5/2006 | Yuan | ......................... C08J 9/26 528/125 |

(Continued)

*Primary Examiner* — Christopher P Jones
*Assistant Examiner* — Phillip Y Shao
(74) *Attorney, Agent, or Firm* — CANTOR COLBURN LLP

(57) ABSTRACT

Disclosed herein are advantageous phase separator devices, and related methods of fabrication and use thereof. The present disclosure provides improved phase separator devices for phase separation of feedstreams, and improved systems/methods for utilizing and fabricating the phase separator devices. More particularly, the present disclosure provides porous (e.g., three-dimensional gradient porous) phase separator devices for phase separation of fluid mixtures (e.g., to separate a two-phase fluid mixture) to a first fluid phase flow (e.g., to a liquid flow) and to a second fluid phase flow (e.g., to a gas flow). At least a portion of the phase separator devices of the present disclosure can be fabricated via machining, powder metallurgy (e.g., sintering), and/or produced utilizing additive manufacturing techniques.

7 Claims, 1 Drawing Sheet

(56) References Cited

U.S. PATENT DOCUMENTS

| | | | | |
|---|---|---|---|---|
| 2007/0022877 A1* | 2/2007 | Marand | ............... | B01D 53/228 |
| | | | | 95/51 |
| 2007/0256969 A1* | 11/2007 | Ding | .................... | B01D 71/32 |
| | | | | 210/490 |
| 2010/0056369 A1* | 3/2010 | Gu | ..................... | B01D 63/066 |
| | | | | 502/402 |
| 2010/0071559 A1* | 3/2010 | Miachon | ............ | B01D 69/141 |
| | | | | 96/135 |
| 2011/0087187 A1* | 4/2011 | Beck | .................... | B01D 71/70 |
| | | | | 427/244 |
| 2014/0021128 A1* | 1/2014 | Tomescu | ........... | B01D 67/0002 |
| | | | | 156/60 |
| 2014/0217013 A1* | 8/2014 | Sato | ................... | H01M 50/423 |
| | | | | 428/398 |
| 2017/0173535 A1* | 6/2017 | Jiang | .................. | B01D 71/027 |
| 2018/0200645 A1* | 7/2018 | Krasinski | ............ | B01D 36/003 |
| 2019/0241712 A1* | 8/2019 | Roller | .................. | C08K 5/098 |
| 2020/0149791 A1* | 5/2020 | Ranjan | ................... | F25B 13/00 |
| 2020/0197868 A1* | 6/2020 | Tano | ................... | B01D 63/061 |

\* cited by examiner

3D GRADIENT POROUS STRUCTURE FOR PHASE SEPARATION UTILIZING ADDITIVE MANUFACTURING METHODS

CROSS-REFERENCE TO RELATED APPLICATION

The present application claims priority benefit to a provisional application which was filed on Sep. 27, 2019, and assigned Ser. No. 62/907,077. The entire content of the foregoing provisional application is incorporated herein by reference.

FIELD OF THE DISCLOSURE

The present disclosure relates to phase separator devices for phase separation of feedstreams and systems/methods for utilizing and fabricating the phase separator devices and, more particularly, to porous (e.g., three-dimensional gradient porous) phase separator devices for phase separation of fluid mixtures (e.g., to separate a two-phase fluid mixture) to a first fluid phase flow (e.g., to a liquid flow) and to a second fluid phase flow (e.g., to a gas flow).

BACKGROUND OF THE DISCLOSURE

In general, there are numerous applications for structures and assemblies for flow control of fluids (e.g., liquids and gases).

An interest exists for improved systems and methods for phase separation of fluids.

These and other inefficiencies and opportunities for improvement are addressed and/or overcome by the systems, methods and devices of the present disclosure.

BRIEF SUMMARY OF THE DISCLOSURE

The present disclosure provides advantageous phase separator devices for phase separation of feedstreams, and improved systems/methods for utilizing and fabricating the phase separator devices. More particularly, the present disclosure provides porous (e.g., three-dimensional gradient porous) phase separator devices for phase separation of fluid mixtures (e.g., to separate a two-phase fluid mixture) to a first fluid phase flow (e.g., to a liquid flow) and to a second fluid phase flow (e.g., to a gas flow). At least a portion of the phase separator devices of the present disclosure can be fabricated via machining, powder metallurgy (e.g., sintering), and/or produced utilizing additive manufacturing techniques.

The present disclosure provides for a phase separator device including a porous structure that extends from a first end to a second end, the porous structure having an inner area having a first plurality of pores, an intermediate area having a second plurality of pores and a first outer area having a third plurality of pores; wherein the pores of the first plurality of pores are interconnected with the pores of the second plurality of pores, and the pores of the second plurality of pores are interconnected with the pores of the third plurality of pores; and wherein the porous structure is configured and dimensioned to separate a fluid mixture introduced to the first end of the porous structure into a first fluid phase flow and a second fluid phase flow.

The present disclosure also provides for a method for utilizing a phase separator device including providing a porous structure that extends from a first end to a second end, the porous structure having an inner area having a first plurality of pores, an intermediate area having a second plurality of pores and a first outer area having a third plurality of pores, and with the first plurality of pores interconnected with the second plurality of pores and the second plurality of pores interconnected with the third plurality of pores; and introducing a fluid mixture to the first end of the porous structure to separate the fluid mixture into a first fluid phase flow and a second fluid phase flow.

The above described and other features are exemplified by the following figures and detailed description.

Any combination or permutation of embodiments is envisioned. Additional advantageous features, functions and applications of the disclosed systems, methods and devices of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following figures are exemplary embodiments wherein the like elements are numbered alike.

Features and aspects of embodiments are described below with reference to the accompanying drawings, in which elements are not necessarily depicted to scale.

Figure 1:
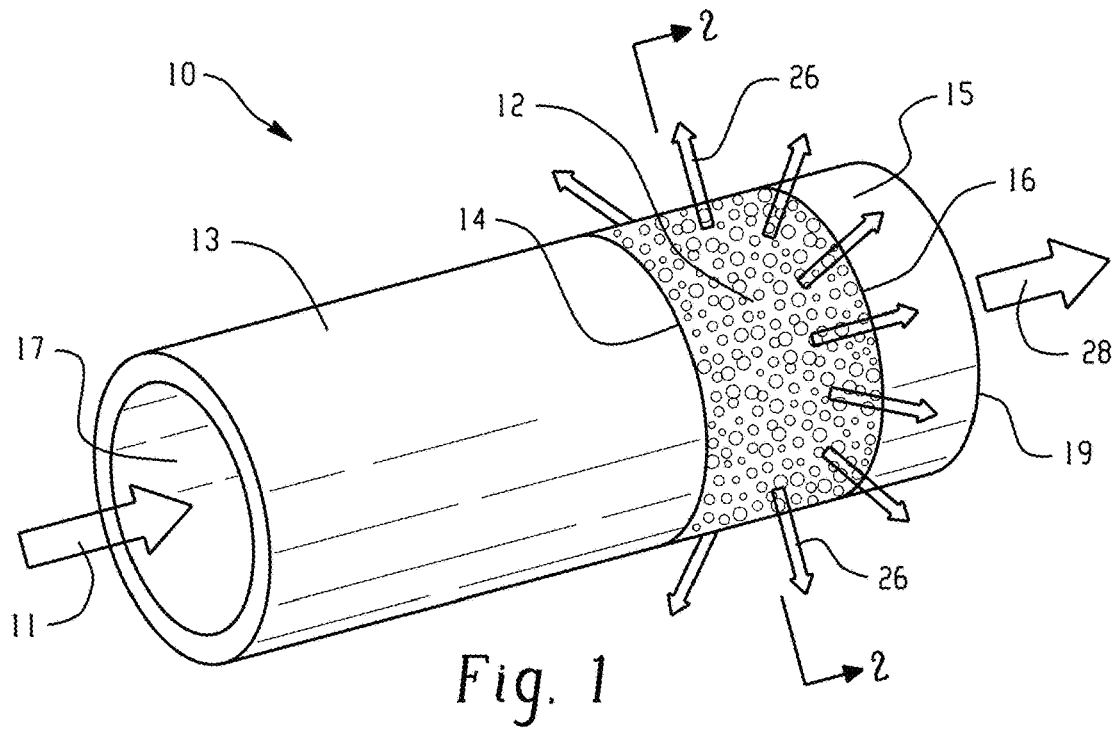
Figure 2:
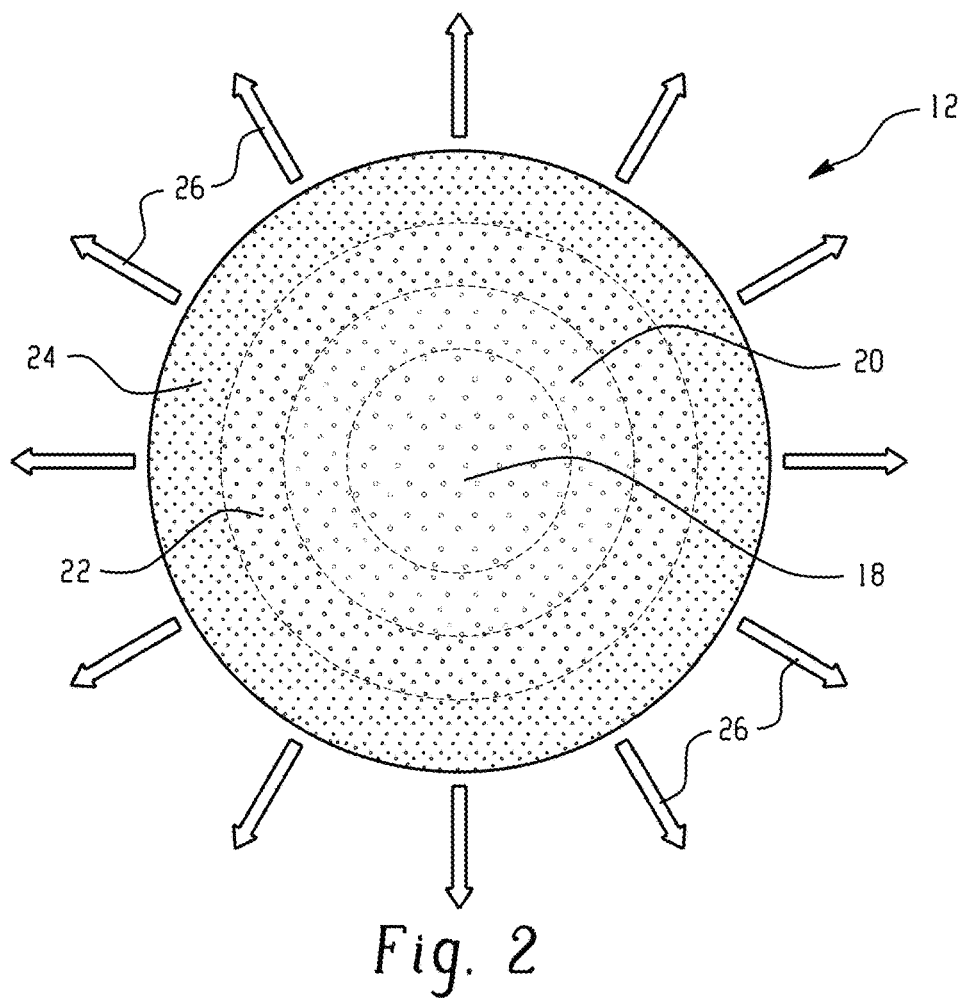

Exemplary embodiments of the present disclosure are further described with reference to the appended figures. It is to be noted that the various features, steps, and combinations of features/steps described below and illustrated in the figures can be arranged and organized differently to result in embodiments which are still within the scope of the present disclosure. To assist those of ordinary skill in the art in making and using the disclosed systems, methods and devices, reference is made to the appended figures, wherein:

FIG. 1 is a side perspective view of an exemplary phase separator device, according to the present disclosure; and FIG. 2 is a cross-sectional view of the porous structure of the phase separator device of FIG. 1.

DETAILED DESCRIPTION OF THE DISCLOSURE

The exemplary embodiments disclosed herein are illustrative of advantageous phase separator devices, and systems of the present disclosure and methods/techniques thereof. It should be understood, however, that the disclosed embodiments are merely exemplary of the present disclosure, which may be embodied in various forms. Therefore, details disclosed herein with reference to exemplary phase separator devices and associated processes/techniques of assembly and use are not to be interpreted as limiting, but merely as the basis for teaching one skilled in the art how to make and use the advantageous phase separator devices and/or alternative phase separator devices of the present disclosure.

The present disclosure provides advantageous phase separator devices for phase separation of feedstreams, and improved systems/methods for utilizing and fabricating the phase separator devices.

More particularly, the present disclosure provides porous (e.g., three-dimensional gradient porous) phase separator devices for phase separation of fluid mixtures (e.g., to separate a two-phase fluid mixture) to a first fluid phase flow (e.g., to a liquid flow) and to a second fluid phase flow (e.g., to a gas flow). At least a portion of the phase separator devices of the present disclosure can be fabricated via machining, powder metallurgy (e.g., sintering), and/or produced utilizing additive manufacturing techniques.

Referring now to the drawings, like parts are marked throughout the specification and drawings with the same reference numerals, respectively. Drawing figures are not necessarily to scale and in certain views, parts may have been exaggerated for purposes of clarity.

As shown in FIG. 1, there is illustrated a phase separator device 10 depicting an embodiment of the present disclosure.

Exemplary phase separator device 10 takes the form of a porous phase separator device 10 for thermal management or the like, although the present disclosure is not limited thereto.

Phase separator device 10 is configured and dimensioned to be utilized for phase separation of feedstreams 11 (e.g., two-phase fluid mixture feedstreams 11).

More particularly and discussed further below, phase separator device 10 includes a porous (e.g., three-dimensional gradient porous) phase separator structure 12 that is configured and dimensioned to be utilized for phase separation of fluid mixtures 11 (e.g., to separate a two-phase fluid mixture 11) to a first fluid phase flow 26 (e.g., to a liquid flow 26) and to a second fluid phase flow 28 (e.g., to a gas flow 28).

In general, phase separator device 10 includes a porous structure 12 that extends from a first end 14 to a second end 16. In exemplary embodiments, the porous structure 12 is substantially cylindrical, although the present disclosure is not limited thereto. Rather, it is noted that porous structure 12 can take a variety of shapes and/or forms.

In certain embodiments, at least a portion of porous structure 12 is fabricated via machining, powder metallurgy (e.g., sintering), and/or produced utilizing additive manufacturing techniques. In some embodiments, the porous structure 12 itself can be fabricated via machining, powder metallurgy (e.g., sintering), and/or produced utilizing additive manufacturing techniques.

The porous structure 12 includes an inner area 18 having a first plurality of pores, an intermediate area 20 having a second plurality of pores, and a first outer area 22 having a third plurality of pores. In some embodiments, phase separator device 10 includes a second outer area 24 having a fourth plurality of pores.

As discussed further below, it is noted that phase separator device 10 can include other numbers of outer areas each having a plurality of pores (e.g., a third outer area (not shown) surrounding second outer area 24, the third outer area having a fifth plurality of pores (with the pores of second outer area 24 interconnected with and larger than the pores of third outer area); a fourth outer area (not shown) surrounding third outer area, the fourth outer area having a sixth plurality of pores (with the pores of third outer area interconnected with and larger than the pores of fourth outer area); etc.).

The first plurality of pores of the inner area 18 are interconnected with the second plurality of pores of the intermediate area 20, and the second plurality of pores of the intermediate area 20 are interconnected with the third plurality of pores of the first outer area 22.

The fourth plurality of pores of the second outer area 24 (if present) are interconnected with the third plurality of pores of the first outer area 22 (and the fifth plurality of pores of the third outer area (if present) are interconnected with the fourth plurality of pores of the second outer area 24).

In exemplary embodiments, the first plurality of pores of the inner area 18 are larger than the second plurality of pores of the intermediate area 20, and the second plurality of pores of the intermediate area 20 are larger than the third plurality of pores of the first outer area 22, and the third plurality of pores of the first outer area 22 are larger than the fourth plurality of pores of the second outer area 24 (if present). Similarly, the fourth plurality of pores of the second outer area 24 are larger than the pores of third outer area (if present), and the pores of the third outer area (if present) are larger than the pores of the fourth outer area (if present), etc.

In certain embodiments, the pores of the first plurality of pores of the inner area 18 have a mean pore size that is greater than or equal to 100 micrometers, and the pores of the fourth plurality of pores of the second outer area 24 have a mean pore size of at least about 0.10 micrometers, preferably a mean pore size of about 0.50 micrometers.

The first, second, third and fourth plurality of pores (and fifth plurality, etc.) can extend from the first end 14 of the porous structure 12 to the second end 16, although the present disclosure is not limited thereto.

In regards to the pores of the first, second, third and fourth plurality of pores (and fifth plurality, etc.), it is noted that the pores can be classified by their size and/or shape. In regards to the pore size, the numerical value represents the mean pore size as one will recognize there will be a distribution in pore sizes for each size category. Furthermore, the pores can take the form of a variety of shapes and/or forms. For example, the pores can be nearly spherical in certain embodiments, or irregularly shaped where the average x-y-z dimensions differ (e.g., greatly differ) from each other in other embodiments. It is noted that the pores can be randomly oriented (e.g., isotropic), or intentionally oriented to provide anisotropic structures to control flow in specific directions. An example of this would be equal flow in the x and y directions and limited flow in the z direction due to the orientation of the pores.

It is noted that the porous structure 12 can have pore size gradients of the pores of the first, second, third and fourth plurality of pores (and fifth plurality, etc.) in all three x-y-z axes. As noted and in one embodiment, the first plurality of pores of the inner area 18 are larger than the second plurality of pores of the intermediate area 20, and the second plurality of pores of the intermediate area 20 are larger than the third plurality of pores of the first outer area 22, and the third plurality of pores of the first outer area 22 are larger than the fourth plurality of pores of the second outer area 24. In other embodiments, the pore sizes of the first, second, third and fourth plurality of pores (and fifth plurality, etc.) can all increase, decrease and/or vary in size when travelling from the first end 14 to the second 16, and/or when travelling tangentially to or away from the center of inner area 18.

In some embodiments, it is noted that the pores may gradually change in size from one area 18, 20, 22, 24, etc., to another. For example, the pores in the inner area 18 may gradually decrease in size when interconnecting with the pores of the intermediate area 20. However, in other embodiments, there may be no gradual change in size from one area 18, 20, 22, 24, etc., to another.

In exemplary embodiments, the intermediate area 20 surrounds the inner area 18, and the first outer area 22 surrounds the intermediate area 20. The second outer area 24, if present, surrounds the first outer area 22. Similarly, the third outer area, if present, surrounds the second outer area 24, etc.

The inner area 18, the intermediate area 20, and the first and second outer area 22, 24 (and third outer area, etc.) can extend from the first end 14 of the porous structure 12 to the second end 16, although the present disclosure is not limited thereto.

As shown in FIG. 1, phase separator device 10 can include an inlet section 13 that extends from the first end 14 of the porous structure 12, and can include an outlet section 15 that extends from the second end 16 of the porous structure 12.

Exemplary inlet section 13 is substantially cylindrical and includes an inner inlet lumen 17, and exemplary outlet section 15 is substantially cylindrical and includes an inner outlet lumen 19.

As noted, the porous structure 12 of device 10 is configured and dimensioned to separate a feedstream 11 (e.g., a two-phase fluid mixture stream 11) that is introduced (e.g., via inner inlet lumen 17 of inlet section 13) to the first end 14 of the porous structure 12 into a first fluid phase flow 26 (e.g., a liquid flow 26) and a second fluid phase flow 28 (e.g., gas flow 28).

In exemplary embodiments, the first fluid phase flow 26 exits the porous structure 12 via the fourth plurality of pores of second outer area 24. It is noted that if second outer area 24 is not present, then first fluid phase flow 26 exits the porous structure 12 via the third plurality of pores of first outer area 22. It is also noted that if third outer area is present, then first fluid phase flow 26 exits the porous structure 12 via the pores of the third outer area, etc. Stated another way, first fluid phase flow 26 can exit the porous structure 12 via the pores of the outermost outer area of porous structure 12.

Second fluid phase flow 28 can exit the porous structure 12 via inner outlet lumen 19 of outlet section 15. In certain embodiments, first fluid phase flow 26 is a liquid phase flow 26, and second fluid phase flow 28 is a gas phase flow 28. In other embodiments, first fluid phase flow 26 is a liquid phase flow 26 (e.g., oil or water), and second fluid phase flow 28 is a liquid phase flow 28 (e.g., oil or water).

In some embodiments, the feedstream 11 includes a used refrigerant (e.g., R717 (Ammonia)).

In certain embodiments, the first fluid phase flow 26 exits the porous structure 12 via the pores of the outermost outer area of porous structure 12 via at least one of: (i) capillary action of all the plurality of pores of the porous structure 12 (e.g., capillary action of the first, second, third and fourth plurality of pores); (ii) temperature gradients associated with the porous structure 12; (iii) pressure gradients associated with the porous structure 12; (iv) pore size gradients of all the plurality of pores of the porous structure 12 (e.g., pore size gradients of the first, second, third and fourth plurality of pores); and/or (v) gravity with or without enhancement using centrifugal force (e.g., artificial gravity).

In use, exemplary device 10 utilizes an interconnected three-dimensional network distribution of pores (e.g., the pores of the first, second, third and fourth plurality of pores of structure 12), with the pores designed to separate a two phase mixture 11 (e.g., a gas/liquid mixture 11 or a liquid/liquid mixture 11) flowing into the device 10 into separate exit streams 26, 28. Exemplary exit stream 28 (second fluid phase flow 28) can be the gas phase and the other exit stream 26 (first fluid phase flow 26) can be the liquid phase. The liquid phase of mixture 11 is captured in the pores of structure 12 through capillary action and extracted from the device 10 using a combination of temperature gradients, pressure gradients, pore size gradients, and/or gravity with or without enhancement using centrifugal force (artificial gravity).

One application for device 10 is for thermal management where a refrigerant such as R717 (ammonia) is used to cool a laser diode for a directed energy weapon application. The refrigerant enters the laser diode block as a liquid and the heat from the device boils the coolant creating a two-phase mixture 11 (liquid and gas stream 11). The phase separator device 10 then separates the liquid 26 from the gas 28, and the liquid 26 can be cooled and returned to the cooling loop or storage reservoir for reuse. The gas phase 28 can be discarded as waste or optionally be sent to a condenser system to convert back to a liquid phase for reuse.

Other applications for device 10 can be separation of two or more immiscible liquids (e.g., oil and water, in the case of an environmental spill of petroleum products into oceans, lakes, ponds, rivers, etc.).

Another application for device 10 can be the separation of liquid/liquid mixtures 11 or gas/liquid mixtures 11 (e.g., in a manufacturing process such as production of biodiesel or glycerin).

The phase separator device 10 can be utilized in a continuous process such as in pipelines and/or transfer of fluids from one tank to another. Device 10 may also be used in a batch process where fluid 11 is extracted from a bio-reactor, separated (e.g., into streams 26, 28), and then one phase (26 or 28) returned back to the bio-reactor for further processing and the other (26 or 28) sent off as final product or for additional processing.

The gradient in pore sizes and shape and size of the device 10 can be nearly infinitely adjusted to tune the phase separator device 10 for substantially maximum efficiency (100% separation of fluids 11). The device 10 can also be scaled for very small flow rates (e.g., micro-fluidics) to large flow rates (e.g., industrial manufacturing/cooling, etc.).

In addition, the materials of construction of device 10 and/or structure 12 can be a material that can be fabricated via machining, powder metallurgy (e.g., sintering), and/or produced utilizing additive manufacturing techniques, thereby allowing for compatibility to a wide variety of fluids.

Future studies include simulations and modeling (e.g., using first principal theory) to optimize the size and/or density of pores to capture fluid via capillary action and to further develop the means to extract the fluid from the pores in continuous operations.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A phase separator device comprising:
    a device inlet and a device outlet that are axially spaced apart from each other, wherein the device is shaped as a cylinder with an outer surface that extends axially from the device inlet to the device outlet with a constant outer diameter;
    a cylindrical porous metal structure that is axially intermediate the device inlet and the device outlet, wherein the porous metal structure extends from a first end to a second end;
    an inlet section with an inner inlet lumen, wherein the inlet section forms an inlet hollow cylinder that extends from the device inlet to the first end of the porous metal structure to define an inlet portion of the device outer surface;
    an outlet section with an inner outlet lumen, wherein the outlet section forms an outlet hollow cylinder that extends from second end of the porous metal structure to the device outlet to define an outlet portion of the device outer surface;
    wherein the porous metal structure is without a lumen, wherein the porous metal structure defines an axially intermediate portion of the device outer surface, and wherein the porous metal structure includes a plurality of annular porous areas that are axially aligned with each other, extend between the first and second ends of the porous metal structure, and defines:
        (i) a radial inner area that extends radially outward from a radial center of the device;
        (ii) a radial outer area that radially surrounds the radial inner area and extends radially inward from the device outer surface; and
        (iii) at least one radial intermediate area that extends radially between the radial inner area and the radial outer area;
    wherein the radial inner area has a first plurality of pores, the at least one radial intermediate area has a second plurality of pores, and the radial outer area has a third plurality of pores;
    wherein first pores of the first plurality of pores are larger than second pores of the second plurality of pores, and the second pores of the second plurality of pores are larger than third pores of the third plurality of pores, such that pore sizes decrease from the radial center of the device to the device outer surface; and
    wherein the first pores of the first plurality of pores are interconnected with the second pores of the second plurality of pores, and the second pores of the second plurality of pores are interconnected with the third pores of the third plurality of pores; and
    wherein the porous metal structure is configured to phase separate a fluid mixture comprising a liquid and a gas as an inlet axial flow introduced to the first end of the porous metal structure via the inlet section, into a radial liquid flow and an axial gas flow such that the liquid flow exits the porous metal structure radially via the device outer surface along the porous metal structure and the gas flow exits the device as an outlet axial flow via the outlet section.

2. The device of claim 1, wherein:
    the at least one radial intermediate area that extends radially between the radial inner area and the radial outer area is formed of a plurality of radial intermediate areas that are radially adjacent to one another;
    wherein each of the radial intermediate areas has a respective plurality of pores;
    wherein pore sizes are constant within each of the areas; and
    wherein the pore sizes, in the areas that are radially adjacent to each other, decrease toward the radial outer direction.

3. The phase separator device of claim 1, wherein the metal of at least the first end is compatible with a used refrigerant.

4. The phase separator device of claim 1, wherein the pores of the first plurality of pores have a mean pore size that is greater than or equal to 100 micrometers.

5. The phase separator device of claim 1, wherein the porous metal structure is fabricated via machining, powder metallurgy, sintering, and/or by additive manufacturing.

6. The phase separator device of claim 1, wherein the material of the porous metal structure is compatible with liquid ammonia.

7. A method for utilizing the phase separator device comprising:
    providing the porous metal structure of claim 1; and
    introducing a fluid mixture comprising a gas and a liquid to the first end of the device to separate the fluid mixture into a liquid flow and a gas flow.

* * * * *